United States Patent [19]

Matteo et al.

[11] 4,220,986

[45] Sep. 2, 1980

[54] HINGED BALLAST TRAY

[75] Inventors: Gene T. Matteo, Syracuse; Wilbur A. Sensinger, Baldwinsville, both of N.Y.

[73] Assignee: Crouse-Hinds Company, Syracuse, N.Y.

[21] Appl. No.: 965,129

[22] Filed: Nov. 30, 1978

[51] Int. Cl.[2] .............................................. B60Q 3/04

[52] U.S. Cl. ..................................... 362/362; 362/375

[58] Field of Search ................................ 362/375, 362

[56] References Cited

U.S. PATENT DOCUMENTS

| | | | |
|---|---|---|---|
| 4,019,044 | 4/1977 | Kelly et al. ...................... | 362/362 X |
| 4,156,902 | 5/1979 | Wandler .......................... | 362/362 X |

*Primary Examiner*—Stephen J. Lechert, Jr.

*Attorney, Agent, or Firm*—Sughrue, Rothwell, Mion, Zinn and Macpeak

[57] ABSTRACT

The ballast and associated electrical equipment for a luminaire are mounted in a compartment of the luminaire housing on an elongated tray which is pivoted at one end to a U-shaped bracket which in turn is mounted on the housing so that the tray may be pivoted outwardly for inspection and servicing of the ballast and associated electrical equipment. Upon detaching the U-shaped bracket from the housing the entire tray may be removed from the housing and the U-shaped bracket can be used as a carrying handle.

4 Claims, 5 Drawing Figures

HINGED BALLAST TRAY

BACKGROUND OF THE INVENTION

1. Field of the Invention

The present invention is directed to a ballast support for mounting a ballast and associated electrical equipment within a luminaire housing and more specifically to an arrangement for pivotally mounting the ballast support in the housing to facilitate inspection and assist in carrying upon removal.

2. Prior Art

The U.S. Pat. No. to Murray et al 3,895,227 discloses a U-shaped handle pivotally connected to a ballast housing. However, there is no disclosure or any suggestion of mounting the handle in such a manner that the ballast housing could be swung out of a main housing for inspection.

The U.S. Pat. No. to Kelly et al 4,019,044 shows a removable ballast having carrying handles but there is no provision for pivotally mounting the ballast tray in the housing by means of the handles. The handles of Kelly et al are rigidly secured to the ballast tray.

The U.S. Pat. No. to Baldwin et al 3,387,737 shows a pivoted ballast tray having a detachable hinge arrangement and a carrying handle adjacent thereto. However, the carrying handle does not pivot relative to the ballast tray and is independent of the hinge construction.

The U.S. Pat. No. to Bostonian 3,243,659 shows a pivoted ballast united which is pivoted by means of a carrying handle at one end of the ballast. However, the carrying handle is not pivoted to the ballast to act as a hinge member nor is the handle rigidly secured to the housing.

SUMMARY OF THE INVENTION

The present invention is directed to a new and improved mounting arrangement for ballast trays in a luminaire housing which will permit the relatively heavy ballast tray to be swung out of the housing for inspection and servicing by means of a hinge bracket at one end thereof which also acts as a carrying handle for the ballast tray when completely removed from the housing. Suitable means are provided for detachably securing the opposite end of the ballast tray to the housing.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENT

Figure 1:
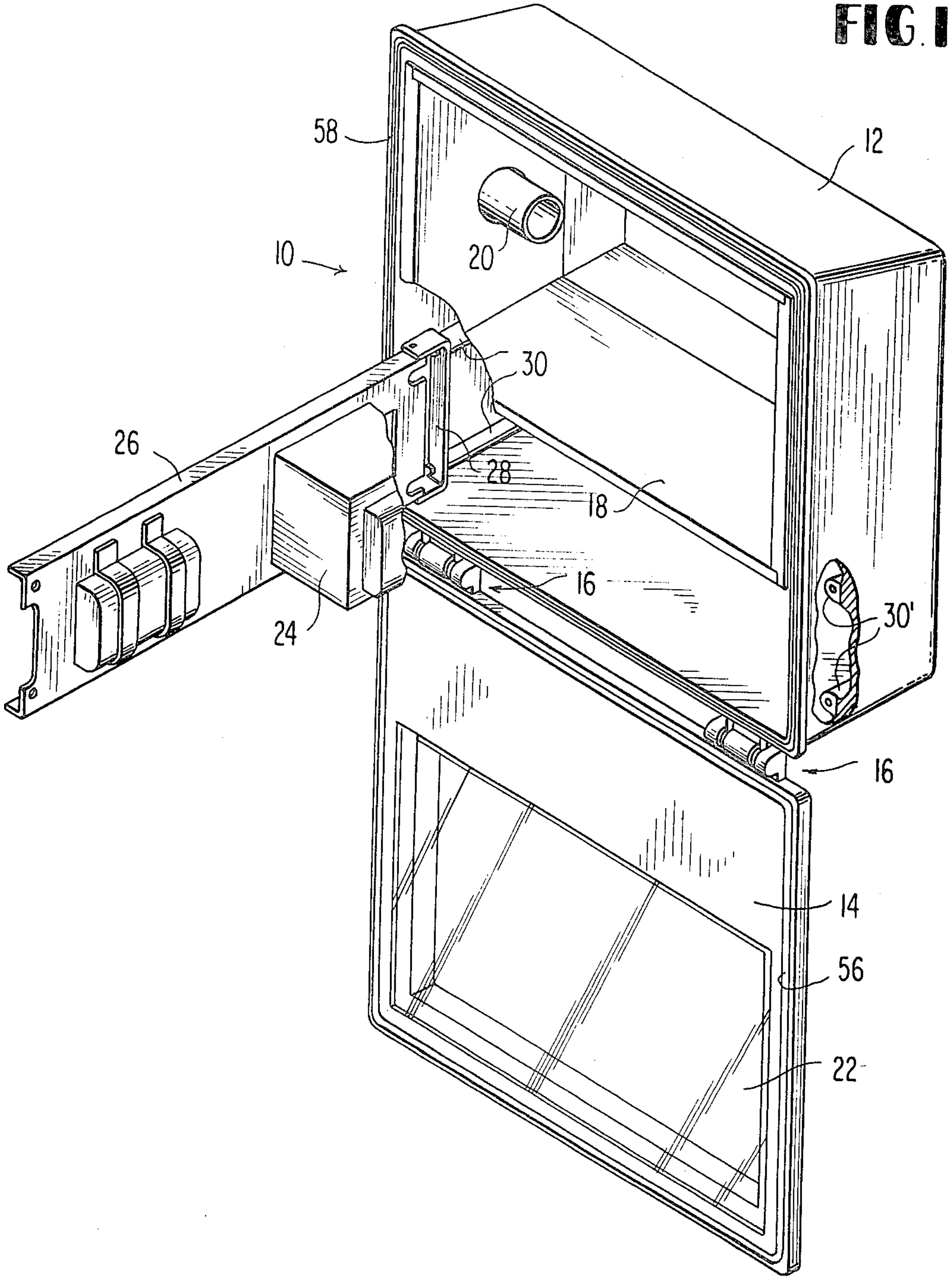
FIG. 1 is a perspective view of a luminaire housing with the cover opened and the ballast tray pivoted outwardly for inspection and servicing.

The luminaire 10 as shown in FIG. 1 is comprised of a housing 12 having a cover 14 pivotally connected at one edge thereof by means of hinges 16. A reflective insert 18 is located within the housing 12 and fills approximately two-thirds of the volume of the housing. A socket 20 for an appropriate light bulb (lamp) extends through one wall of the insert 18. The cover 14 is provided with a transparent or translucent portion 22 which is coextensive with the dimensions of the insert 18. The electrical equipment for the luminaire such as a ballast and the like are adapted to be mounted in the remaining portion of the housing.

The ballast 24 is mounted on a ballast tray 26 which is provided with a substantially U-shaped cross section for purposes of stiffening the tray. A U-shaped bracket 28 is pivotally connected to one end of the tray 26 by means of rivets 59 or any other suitable fasteners which will allow pivotal movement of the bracket 28 and tray 26 relative to each other. The housing 12 is provided with four identical attachment bosses 30 in that portion of the housing in which the ballast is adapted to be received. The U-shaped bracket 28 is secured to the ends of two adjacent bosses by means of screws 32 so that the ballast tray 26 can pivot into and out of the housing 12 on the U-shaped bracket which is rigidly secured to the housing 12. When the ballast tray 26 is pivoted into the position shown in FIG. 2 with the ballast 24 located inside the housing, the opposite end of the ballast tray 26 can be secured to the other bosses 30 by means of screws 32 to detachably hold the ballast within the housing. The end of the ballast tray 26 adjacent the U-shaped bracket 28 is provided with a pair of notches 34 which are adapted to be aligned with the bosses 30 upon which the U-shaped bracket 28 is to be mounted to facilitate the insertion and removal of the attaching screws 32.

Figure 2:
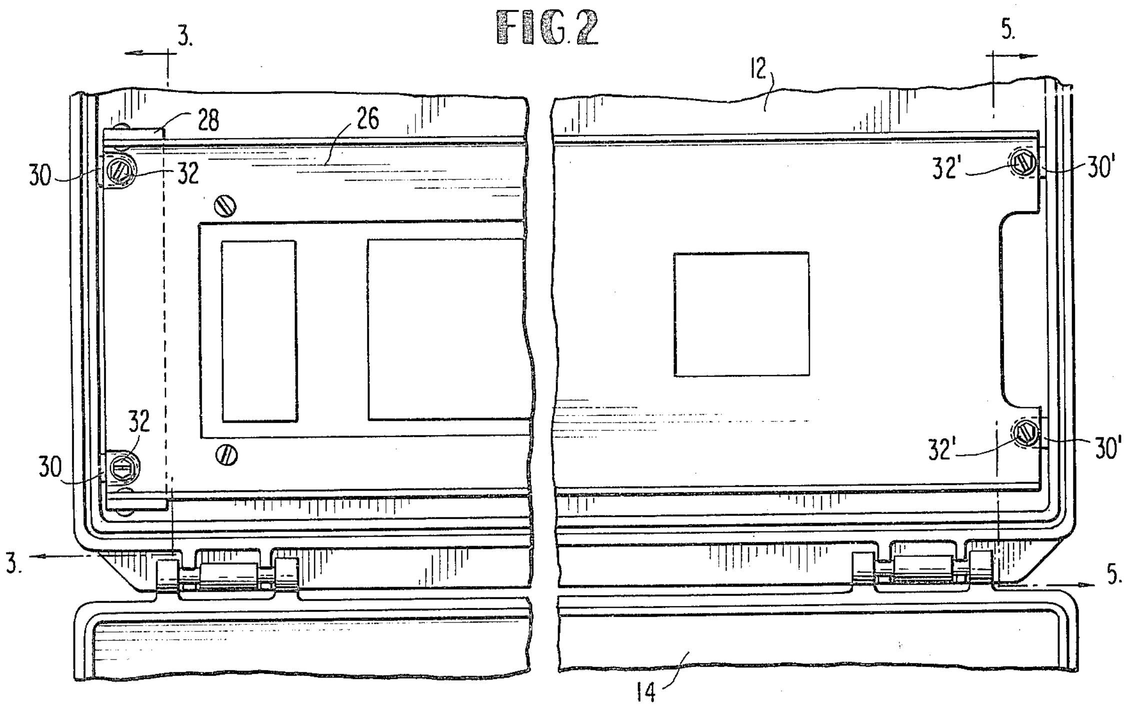
FIG. 2 is a front elevation view of the open housing as shown in FIG. 1 with the ballast tray secured at both ends within the housing.
Figure 3:
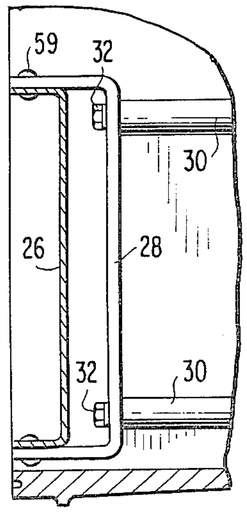
FIG. 3 is a sectional view taken along the line 3—3 of FIG. 2.
Figure 4:
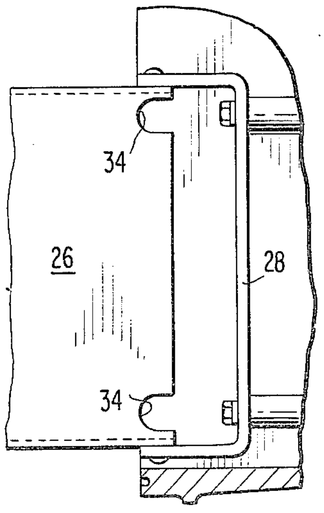
FIG. 4 is a sectional view similar to that shown in FIG. 3 but with the ballast tray pivoted outwardly of the housing.
Figure 5:
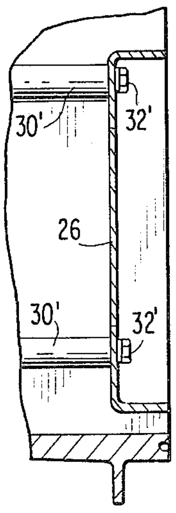
FIG. 5 is a sectional view taken along the line 5—5 of FIG. 2.

Therefore, if it is necessary to inspect or service the ballast 24 or any of the other associated electrical equipment which would also be mounted on the ballast tray 26 it is only necessary to remove the two fasteners 32' and pivot the ballast tray 26 from the position shown in FIG. 2 to the position shown in FIG. 1. The fasteners 32' could be of the type which would be held captive to the ballast tray 26 to prevent loss. If it is desired to completely remove the ballast tray 26 it is only necessary to pivot the ballast tray 26 to a position such as that shown in FIG. 2 wherein ready access can be had to the screws 32 for removing the same. The U-shaped bracket 28 which is pivotally connected to the ballast tray 26 then can serve as a carrying handle.

The cover 14 is secured to housing 12 by hinges 16. The cover 14 can readily pivot from a closed position to an open position as shown in FIGS. 1 and 2 where the door hangs down freely to provide full and complete access to the ballast tray 26. The door 14 may be provided with a peripheral gasket 56 which is adapted to mate in a complementary groove 58 formed in the rim of the housing 12 to prevent the entry of moisture into the luminaire housing.

While the invention has been particularly shown and described in reference to a preferred embodiment thereof, it will be understood by those in the art that various changes in form and details may be made therein without departing from the spirit and scope of the invention.

What is claimed is:

1. A ballast tray of the type adapted to be mounted in a housing for a light source comprising a U-shaped bracket pivotally connected at opposite ends thereof to one end of said ballast tray, means for detachably securing said U-shaped bracket to the housing and means at the opposite end of said ballast tray for detachably securing the opposite end of said ballast tray to the housing.

2. A ballast tray as set forth in claim 1, further comprising notch means located in the end of said ballast tray adjacent said U-shaped bracket which are alignable with the securing means to facilitate the attaching and detaching of the U-shaped bracket and ballast tray to the housing.

3. A luminaire comprising a housing having a cover pivotally connected thereto, light source means located within said housing, reflecting means substantially surrounding said light source means, a ballast receiving chamber located in said housing adjacent said reflecting means, a ballast assembly including a ballast tray located in said ballast receiving chamber, pivot means for securing one end of the ballast tray to said housing to enable said ballast tray to be swung out of the housing for servicing and means for detachably securing the opposite end of said ballast tray to said housing, said pivot means comprising a U-shaped bracket pivotally connected at opposite ends to said ballast tray and means for detachably securing said U-shaped bracket to said housing.

4. A luminaire as set forth in claim 3, further comprising notch means located in the end of said ballast tray adjacent said U-shaped bracket which are alignable with the securing means to facilitate the attaching and detaching of the U-shaped bracket and ballast tray to the housing.

* * * * *